(12) United States Patent
Tjader

(10) Patent No.: US 8,720,038 B2
(45) Date of Patent: May 13, 2014

(54) METHOD AND DEVICE TO REMOVE PIPE

(75) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 348 days.

(21) Appl. No.: 13/297,914

(22) Filed: Nov. 16, 2011

(65) Prior Publication Data

US 2012/0060341 A1 Mar. 15, 2012

Related U.S. Application Data

(62) Division of application No. 11/627,760, filed on Jan. 26, 2007, now Pat. No. 8,061,001.

(60) Provisional application No. 60/762,754, filed on Jan. 27, 2006.

(51) Int. Cl.
*B23P 19/04* (2006.01)

(52) U.S. Cl.
USPC .................................. 29/559; 29/280; 29/255

(58) Field of Classification Search
USPC .................... 29/559, 280, 255, 270, 263, 426
See application file for complete search history.

(56) References Cited

U.S. PATENT DOCUMENTS

| | | | |
|---|---|---|---|
| 4,568,036 A | 2/1986 | Kearney | |
| 5,388,781 A | 2/1995 | Sauber | |
| 5,607,143 A | 3/1997 | Regal | |
| 6,672,802 B2 | 1/2004 | Putnam | |
| 6,799,923 B2 | 10/2004 | Carter et al. | |
| 7,731,471 B2 | 6/2010 | Voegeli et al. | |
| 8,061,001 B2* | 11/2011 | Tjader | 29/280 |
| 2006/0099035 A1 | 5/2006 | Wentworth | |
| 2007/0209184 A1* | 9/2007 | Tjader | 29/280 |
| 2012/0060341 A1* | 3/2012 | Tjader | 29/426.2 |

OTHER PUBLICATIONS

"U.S. Appl. No. 11/627,760 Non-Final Office Action mailed Oct. 14, 2010", 7.
"U.S. Appl. No. 11/627,760 Restriction Requirement mailed Jul. 7, 2010", 6 pgs.
"U.S. Appl. No. 11/627,760, Final Office Action mailed Apr. 1, 2011", 6 pgs.
"U.S. Appl. No. 11/627,760, Notice of Allowance mailed Jul. 13, 2011", 7 pg s.
"U.S. Appl. No. 11/627,760, Pre Appeal Brief Request for Review filed Jun. 1, 2011", 3 pgs.
"U.S. Appl. No. 11/627,760, Response filed Jan. 14, 2011 to Non Final Office Action mailed Oct. 14, 2010", 6 pgs.
"U.S. Appl. No. 11/627,760, Response filed Jul. 30, 2010 to Restriction Requirment mailed Jul. 7, 2010", 5 pgs.

* cited by examiner

*Primary Examiner* — Lee D Wilson
(74) *Attorney, Agent, or Firm* — Schwegman Lundberg & Woessner, P.A.

(57) ABSTRACT

A pipe removal method includes navigating a flexible element through a first pipe. At least a portion of the flexible element is coupled with the first pipe. The flexible element and the first pipe are pulled as a composite assembly, and the flexible element reinforces the tensile strength of the first pipe. In one example, the first pipe is at least pulled in compression between the point of coupling between the flexible element and the first pipe and a proximal end of the flexile element. In another example, the method includes wrapping the composite assembly around a spool. The composite assembly is thereby removed from the ground surrounding the first pipe.

27 Claims, 10 Drawing Sheets

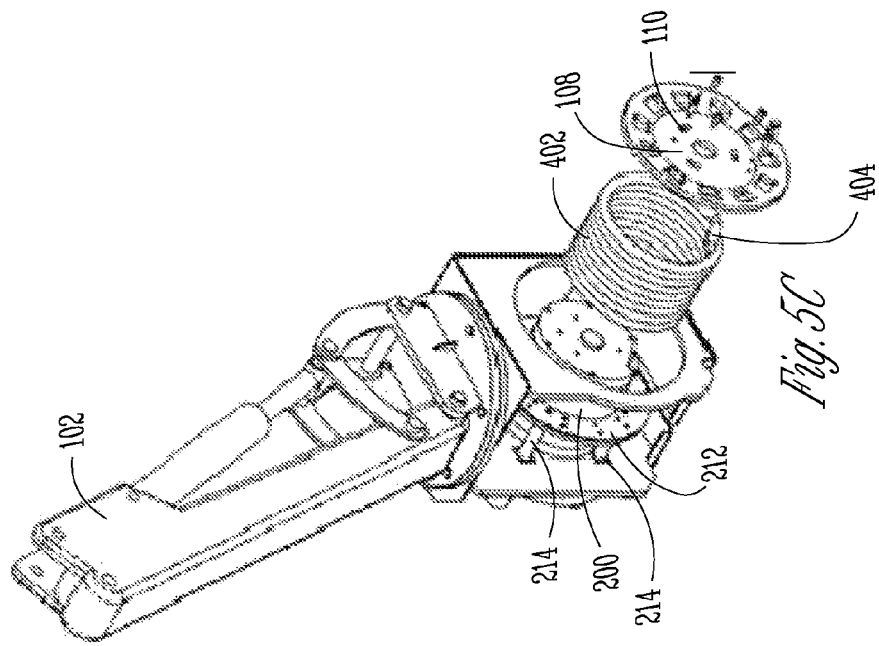
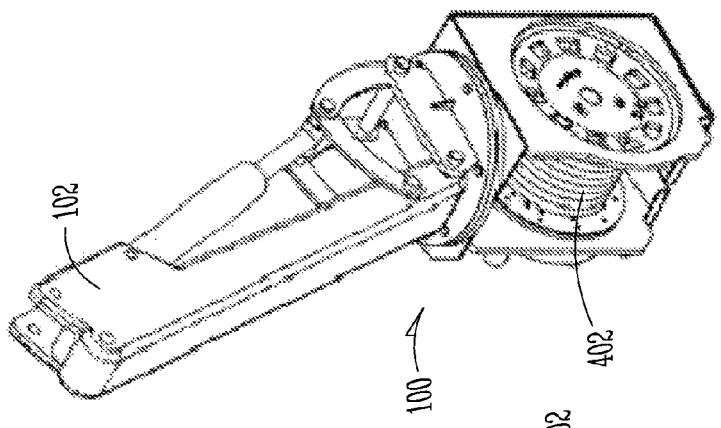
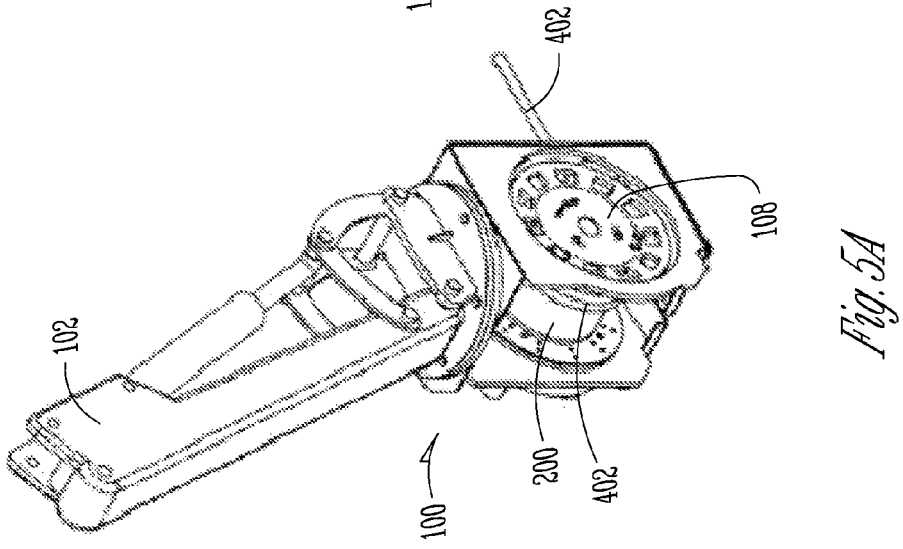

METHOD AND DEVICE TO REMOVE PIPE

PRIORITY APPLICATIONS

This patent application is a Continuation of U.S. application Ser. No. 11/627,760, filed on Jan. 26, 2007 and issued on Nov. 22, 2011 as U.S. Pat. No. 8,061,001, which claims the benefit of priority, under 35 U.S.C. Section 119(e), to U.S. Provisional Patent Application Ser. No. 60/762,754, filed on Jan. 27, 2006, which is incorporated herein by reference.

TECHNICAL FIELD

Pipe replacement and in particular assemblies and methods for removing existing pipes and positioning replacement pipes.

BACKGROUND

Pipe, such as plastic, copper, lead pipe and the like, has been used for connecting homes and creating networks for utilities, for instance, water, sewage and natural gas. As pipes become older, they break down, crack, develop scaling on interior surfaces that can clog the pipe, etc. and thereby require replacement.

A technique known as pipe bursting is currently used as a method to replace underground pipe without the need to completely dig up the pipe to be replaced. A pipe breaking device, such as an expander or a mole, is pulled by a cable through the existing pipe while it is still underground. The expander is designed to break, split or burst the pipe, and at the same time to push the old pipe into the surrounding soil. The expansion of the old pipe allows the expander to pull a replacement pipe into place.

In some situations, instead of leaving pipe in the ground it is desirable to remove the pipe (e.g., where the pipe includes an environmentally hazardous material such as lead). Some pipe is ductile, such as lead or copper, and has a low tensile strength. Pulling on ductile pipe to remove it from the ground may result in tensile failure, thereby leaving a portion of the pipe in the ground. The section of pipe remaining is difficult to extract and may require excavation for removal.

What is needed is a pipe removal system that provides an option of pipe removal in contrast to pipe bursting. What is further needed is consistent removal of pipe without fracturing of the pipe. What is still further needed is a pipe removal system capable of removing low tensile strength pipe and replacing the pipe with a new pipe.

BRIEF DESCRIPTION OF THE DRAWINGS

FIG. 5A is a perspective view showing the pipe removal assembly with a pipe partially coiled around a spool.

FIG. 5B is a perspective view showing the pipe removal assembly with the pipe coiled around the spool.

FIG. 5C is a perspective view showing the pipe removal assembly with the coil of pipe ejected off of the spool by a push plate.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1A:
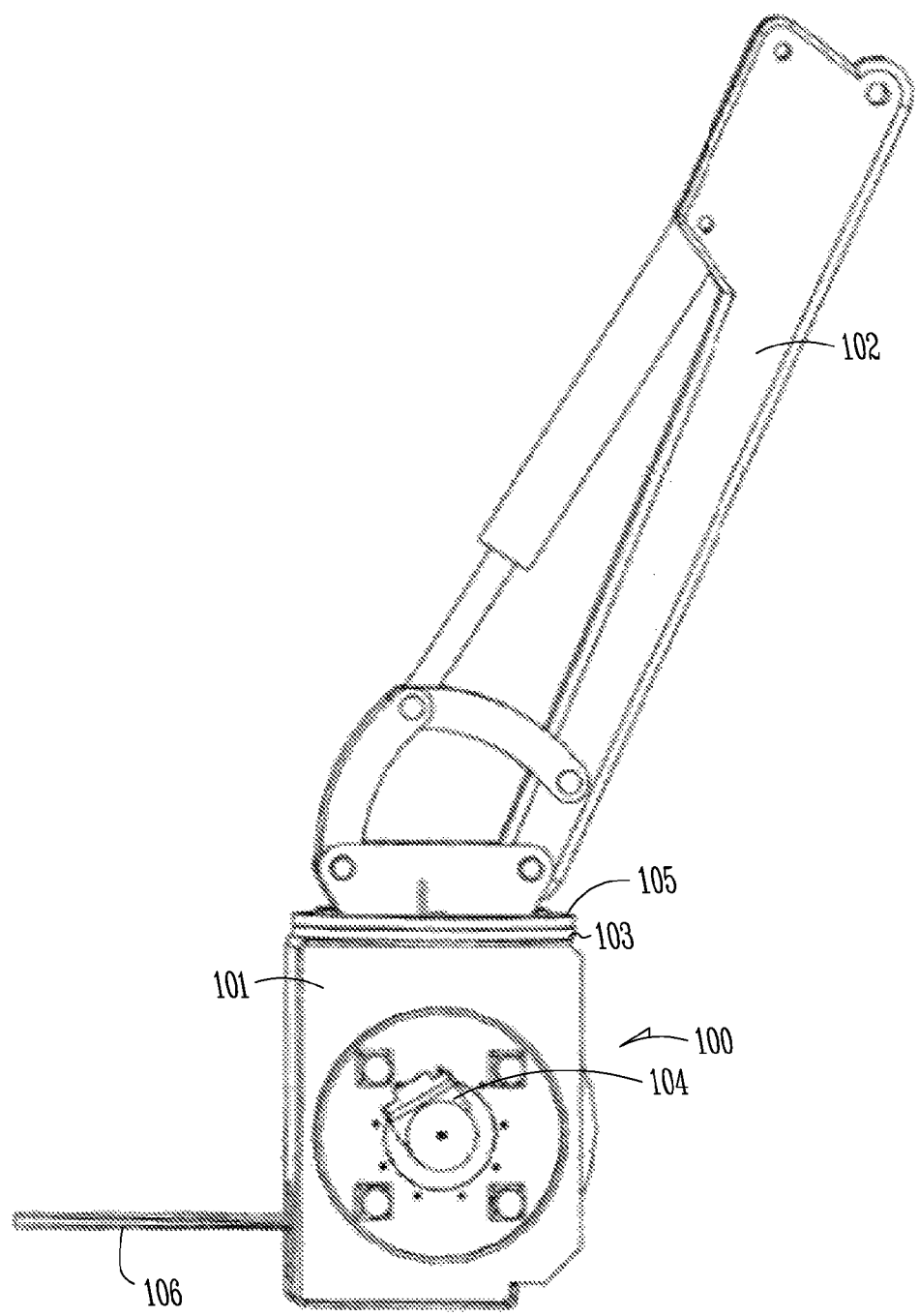
FIG. 1A is a side view of one example of a pipe removal assembly coupled with a ground working implement.
Figure 1B:
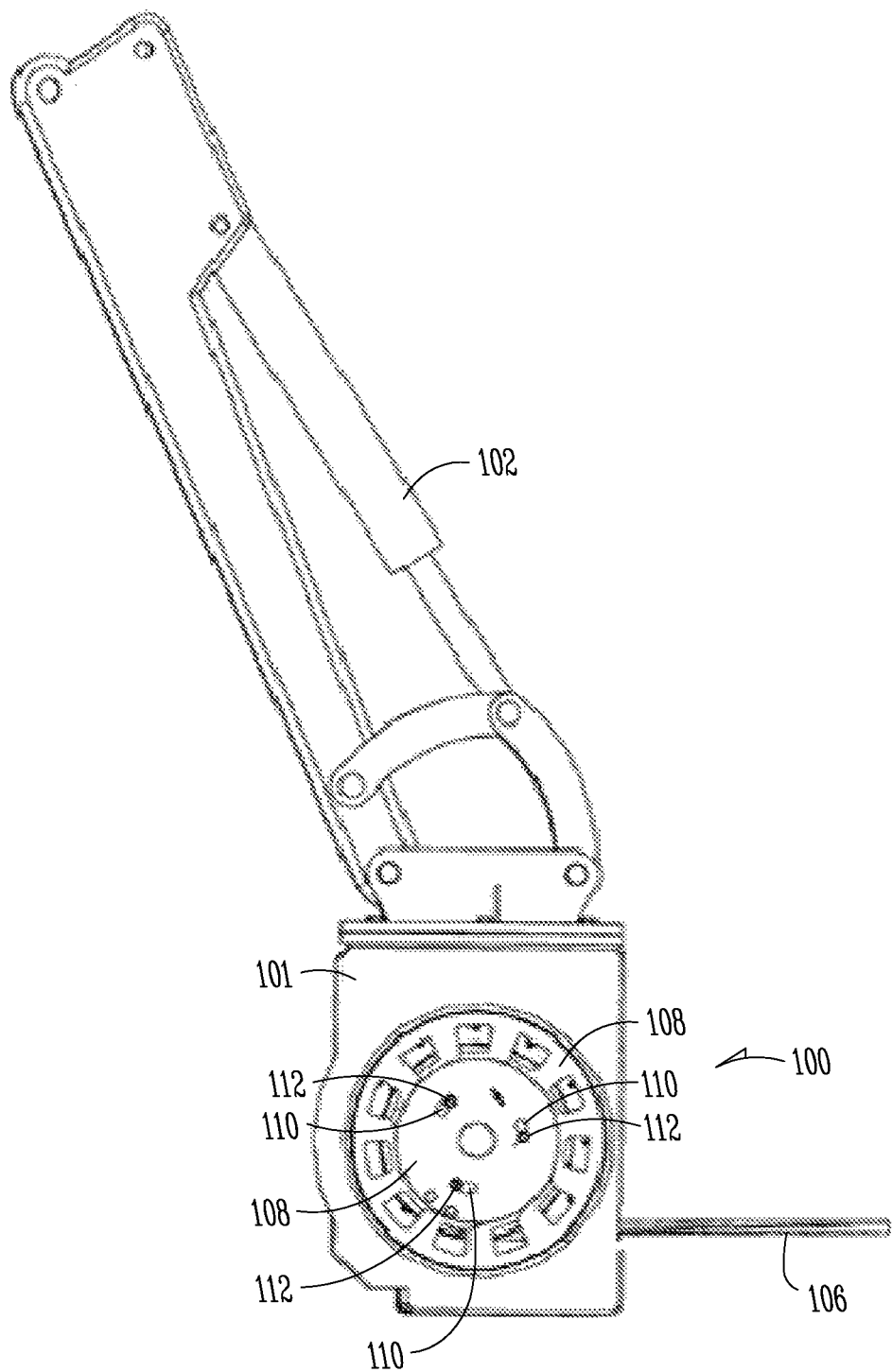
FIG. 1B is a side view of the pipe removal assembly showing one example of a removable end plate.

One example of a pipe removal assembly 100 is shown in FIGS. 1A, 1B. The pipe removal assembly 100 is shown attached to ground working implement 102, such as the boom of a backhoe. The pipe removal assembly includes a housing 101. The housing 101 has at least one feature sized and shaped to couple the pipe removal assembly 100 with the ground working implement 102. For example, the housing 101 includes a coupling plate 103 sized and shaped to mate with the ground working implement 102. The ground working implement 102 optionally includes a complementary plate 105 sized and shaped to mate with the coupling plate 102. In another example, the housing 101 includes features (e.g., bolts, quick connect fasteners and the like) for coupling the pipe removal assembly 100 with the ground working implement 102. Optionally, the pipe removal assembly 100 includes a motor 104 sized and shaped to couple with hydraulic lines from the ground working implement 102. For instance, the motor 104 includes, but is not limited to, a vane pump. While not necessary, the use of a hydraulic motor 104 (e.g., a vane pump and the like) is advantageous because of hydraulic accessory lines available on the ground working implement 102, such as the boom of a backhoe. In another example, the motor 104 is an electric motor, gas motor and the like. The motor 104 is adapted to turn a spool and wrap a pipe 106 around the spool, as further described below. The motor 104 includes, but is not limited to, a hydraulic motor such as a vane pump.

FIG. 1B shows a side of the pipe removal assembly 100 coupled with the ground working implement 102. In one example, the pipe removal assembly 100 includes an end plate 108 removably coupled with the spool. As described further below, removal of the end plate 108 permits access to the pipe 106 wrapped around the spool. For example, removal of the end plate 108 permits ejection of the pipe 106 from the spool. Optionally, the end plate 108 is removably coupled with the spool with features including, but not limited to, bolts, quick connect fasteners, hook and catch fasteners, cotter pins and the like. As shown in FIG. 1B, the end plate 108 is coupled to the spool (described below) with slots 110 sized and shaped to receive pins 112 extending from the spool. The slots 110, in yet another example, include keyhole slots. The pins 112 have heads with a larger profile than at least a portion of the slots 110. The end plate 108 is removed from the spool by rotating the end plate (e.g., in the clockwise direction as shown in FIG. 1B) so the pins 112 slip through the portions of the slots with larger openings, in another example.

Figure 2A:
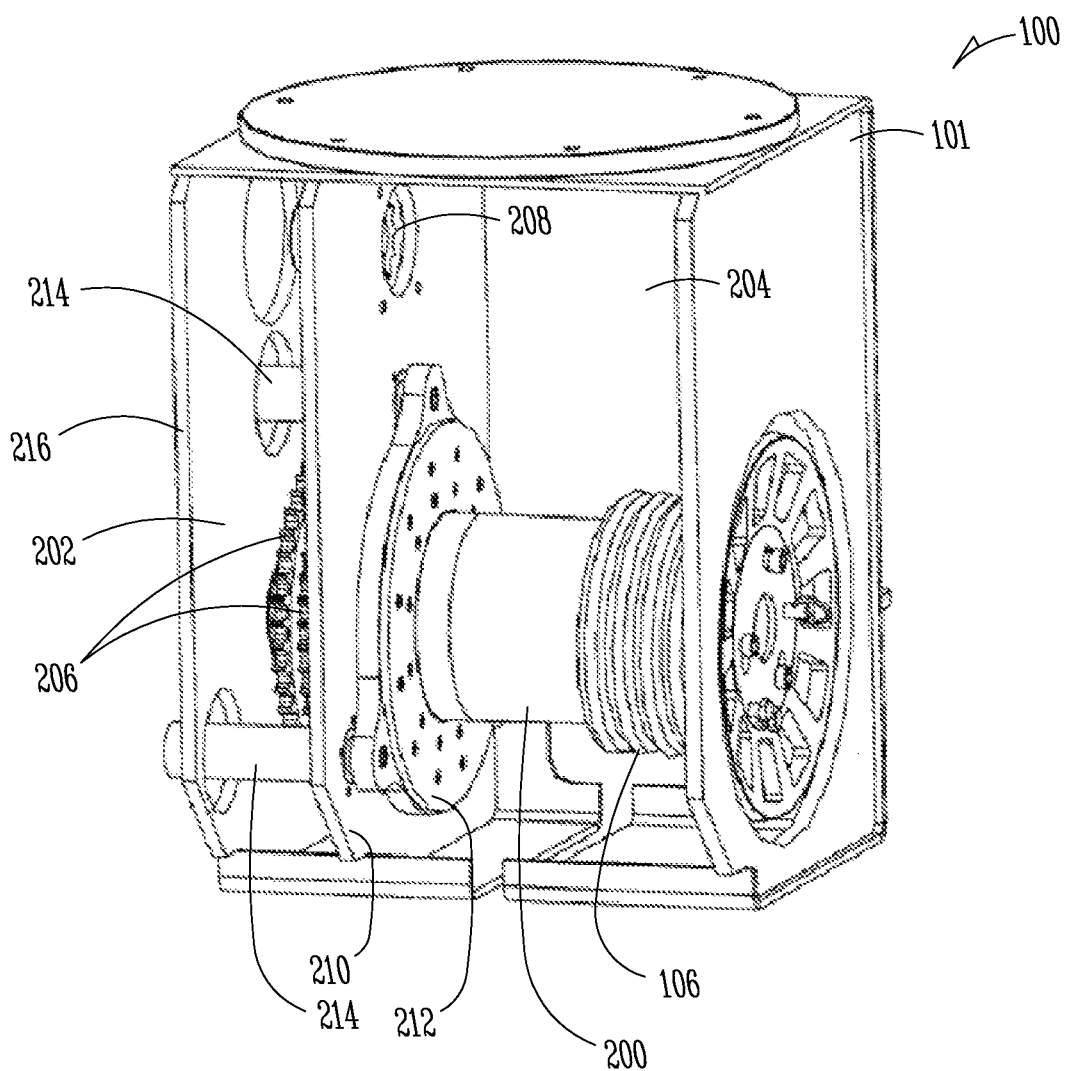
FIG. 2A is a perspective view of another example of the pipe removal assembly with a drive system including a chain drive.
Figure 2B:
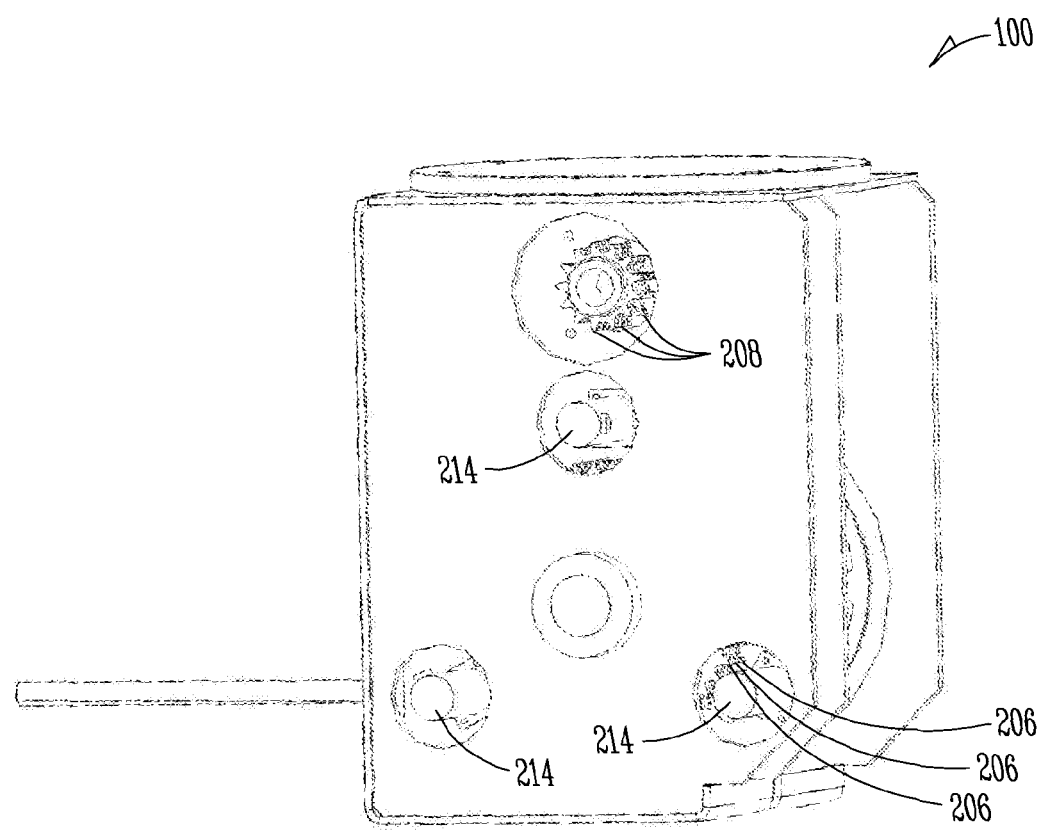
FIG. 2B is another perspective view of the pipe removal assembly with a drive system including a chain drive.

Another example of the pipe removal assembly 100 is shown in FIG. 2A. The spool 200 extends between a driving portion 202 and a wrapping portion 204 within the housing 101. In one example, the spool 200 is a cylinder with a substantially circular cross section. As shown in FIG. 2A, a pipe 106 is wrapped around a portion of the spool 200. The spool 200 is constructed with materials having sufficient strength to pull and wrap the pipe 106 around the spool 200. For instance, the spool 200 includes, but is not limited to, steel. The spool 200 is coupled with at least one output sprocket 206 in the driving portion 202, in another example. In yet another example, the spool 200 is coupled with two or more output sprockets 206. For instance, as shown in FIG. 2B, the spool is coupled with three output sprockets 206. In the driving portion 202, the pipe removal assembly 100 further includes an input sprocket 208 coupled with the motor 104. Similarly to the output sprocket 206, in yet another example, the pipe removal assembly 100 includes two or more input sprockets 208 (as shown in FIG. 2B). Using multiple pairs of input and output sprockets 208, 206 facilitates the transmission of greater torque to the spool 200 in a relatively inexpensive manner compared to other assemblies (e.g., such as direct drives and planetary gear assemblies). In still another example, the spool 200, output sprocket 206 and the input sprocket 208 are rotatably supported in the housing 101 by bearings (e.g., journal bearings, needle bearings and the like). The bearings are carried, in yet another example, substantially adjacent to a partition 210 that divides the housing 101 into the driving portion 202 and the wrapping portion 204.

The input sprocket 208 transmits power from a motor, such as motor 104 (FIG. 1A), along a drive chain to the output sprocket 206. Where multiple sets of output and input sprockets 206, 208 are used a corresponding number of drive chains extend between the sprockets. Referring again to FIG. 2A, in operation, the motor 104 (FIG. 1A) transmits power to the smaller input sprockets 208, then through the drive chains, to the larger output sprockets 206 and the spool 200 coupled thereto to generate a mechanical advantage therebetween (i.e., increasing the pulling power of the output sprocket 206 at the expense of rotational speed). In one example, the output sprocket 206 generates sufficient torque to pull at least around 30,000 pounds with the spool 200.

Figure 3:
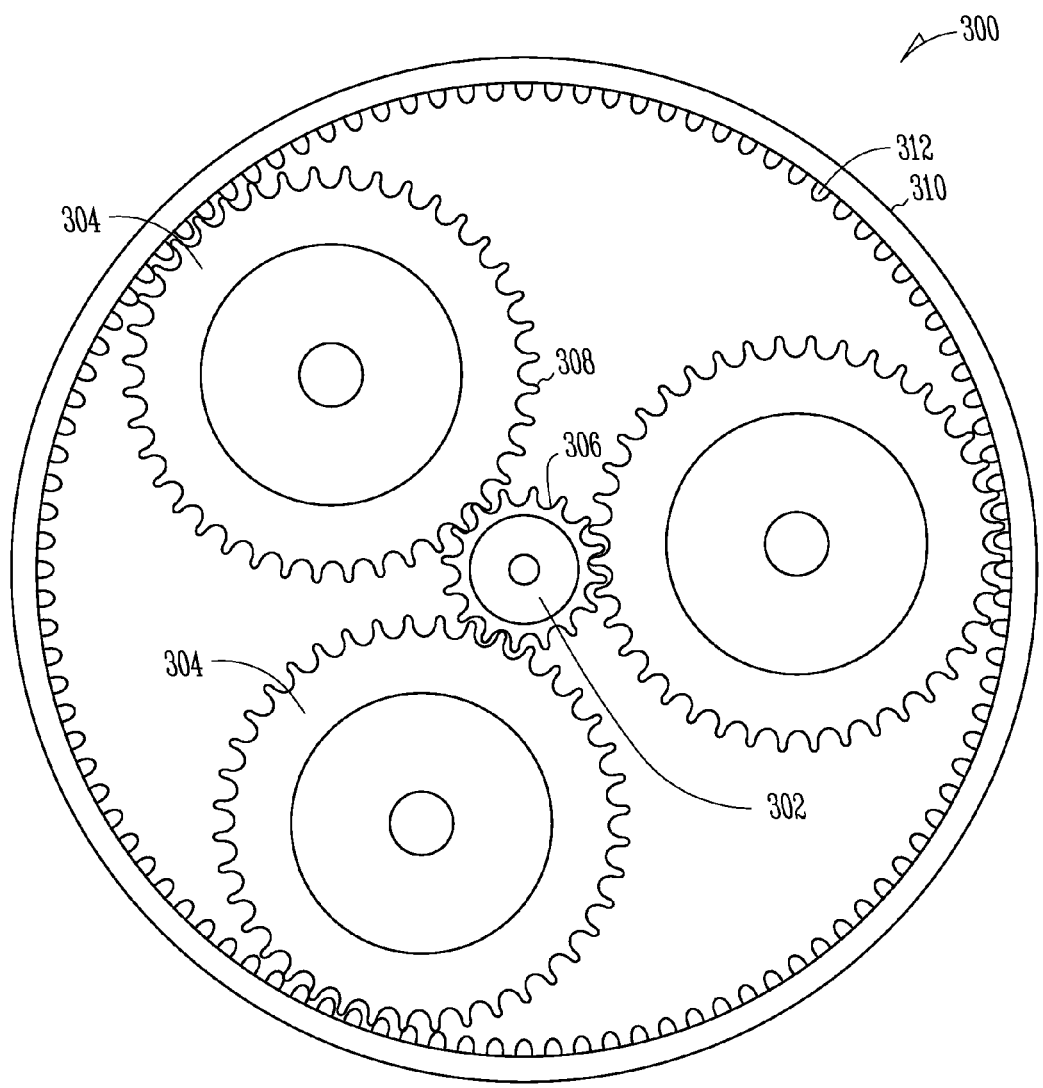
FIG. 3 is a perspective view of yet another example of the pipe removal assembly with a drive system including a planetary gear assembly.

Referring now to FIG. 3, in another example, the pipe removal assembly 100 (FIGS. 1A, B) includes another mechanical advantage system including, but not limited to a planetary gear system 300. The planetary gear system 300 shown in FIG. 3 is one example of a planetary gear system usable with the pipe removal assembly 100. In yet another example, the planetary gear system 300 is rotatably coupled on a wall 216 of the housing 101 shown in FIG. 2A. A sun gear (input gear) 302 is positioned substantially at the center of the planetary gear system 300. Planet gears 304 surround at least a portion of the sun gear 302. The teeth 306 of the sun gear 302 and the teeth 308 of the planet gears 304 mesh so rotation of the sun gear 302 is transmitted to the planet gears 304. A ring gear 310 extends around both the sun gear 302 and the planet gears 304, and the teeth 312 of the ring gear 310 are engaged with the planet gears 304. Optionally, the ring gear 310 is coupled with the spool 200 (FIG. 2A). In another example, the spool 200 includes an interior surface acting as the ring gear 310 including the teeth 312.

In operation, the mechanical advantage system is coupled between a motor, such as motor 104, and the spool 200. In one example, the motor 104 shown in FIG. 2A is coupled with the sun gear 302. The sun gear 302 transmits rotation from the motor 104 to the planetary gears 304. The planetary gears 304 transmit rotation from the sun gear 302 to the ring gear 310 and spool 200. Transmitting rotation from the sun gear to the larger ring gear 310 generates a mechanical advantage. The pulling power of the ring gear 310 is increased at the expense of rotation speed. In another example, the ring gear 310 generates sufficient torque to pull at least around 30,000 pounds with the spool 200. The planetary gear system 300 provides a mechanical advantage system that transmits high torque and is also highly reliable.

Referring again to FIG. 2A, a push plate 212 extends around at least a portion of the spool 200 substantially adjacent to the partition 210. Optionally, the push plate 212 has an inner perimeter slightly larger than the spool 200 and an outer perimeter larger than the spool. In another option, the push plate 212 extends around only a portion of the spool 200. The push plate 212 is moveably coupled along the spool 200 and adapted to move over at least a portion of the spool 200. In yet another example, the push plate 212 is coupled with at least one thrusting system 214 (e.g., a hydraulic cylinder and piston, compressed air actuator, electric actuator, manual actuator and the like) adapted to move the push plate 212 along the spool 200. As shown in FIG. 2B, the push plate 212 is coupled with three thrusting systems 214 including, for example, hydraulic pistons and hydraulic cylinders. The thrusting systems 214 are coupled with the hydraulics of the ground working implement 102 (FIGS. 1A, B), optionally.

Figure 4:
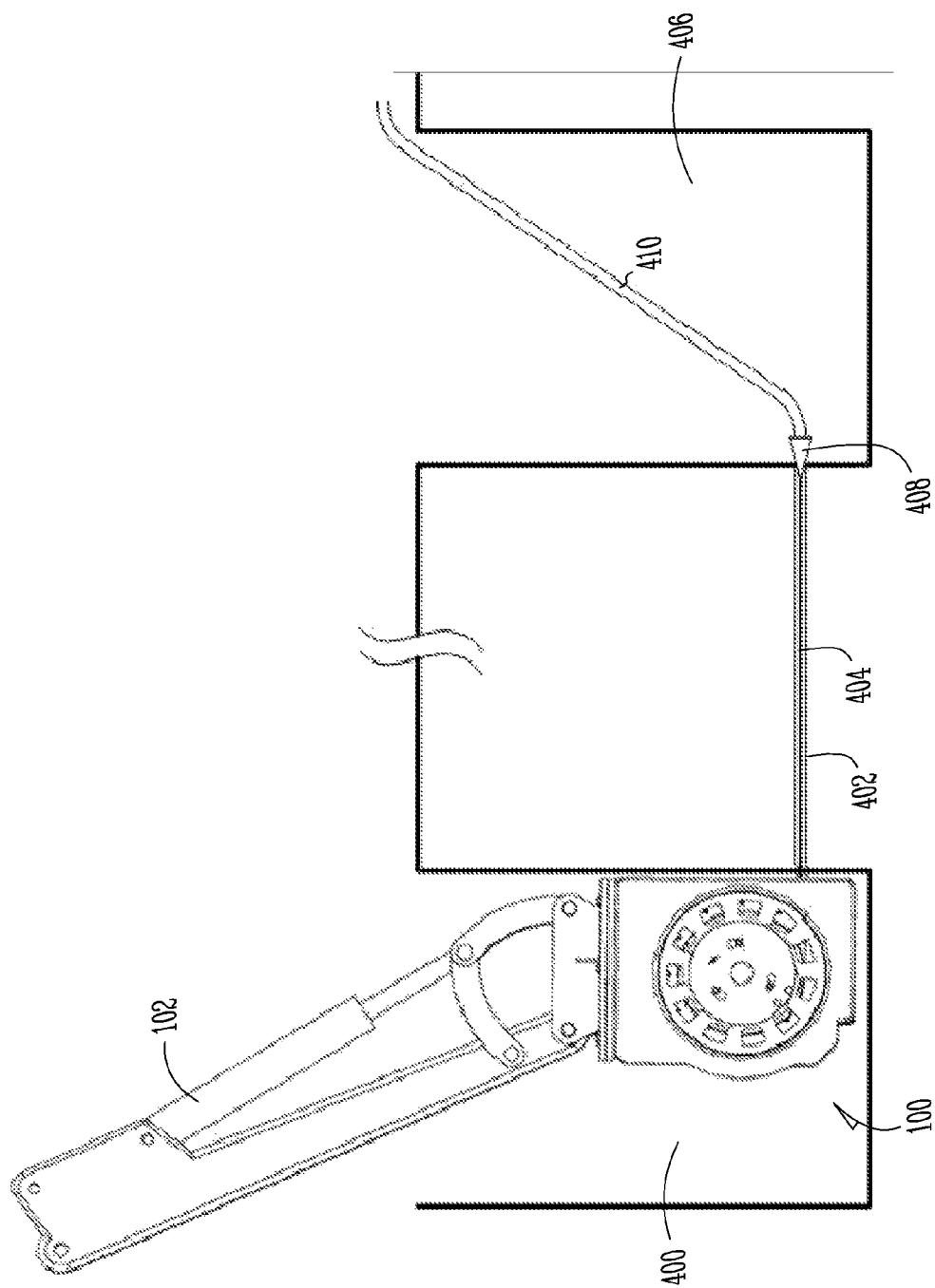
FIG. 4 is a side view showing the pipe removal assembly in one example of operation.

As shown in FIG. 4, the pipe removal assembly 100 is shown coupled to the ground working implement 102. The ground working implement 102 positions the pipe removal assembly 100 in a first trench 400 substantially adjacent to a pipe 402. A flexible element 404 extends through the pipe 402 and into at least the second trench 406. In one example, the flexible element 404 is navigated through the pipe 402 from the first trench 400 to the second trench 406. In another example, the flexible element 404 is navigated from the second trench 406 through the pipe 402 to the first trench 400. In yet another example, the flexible element 404 is coupled with the spool 200 (FIG. 2A) to facilitate wrapping of the flexible element 404 around the spool 200 as the spool is rotated by a mechanical advantage assembly (e.g., one of the assemblies described above). Optionally, the flexible element 404 includes, but is not limited to, a metal strand constructed with a small number of wires. The advantages of using a metal strand include, but are not limited to, the strand being relatively stiff for easy pushing through the pipe 402. Additionally, the small number of wires of the metal strand ensure the strand is relatively inexpensive and thereby disposable.

In another example, the flexible element 404 is a cable, chain, strip, ribbon and the like. In yet another example, the flexible element includes, but is not limited to, a metal such as steel. Other materials include, for instance, polymers and the like. The flexible element 404 is constructed to provide supplementary tensile strength to withstand spool 200 pulling forces, such as at least 30,000 pounds or more of pulling force from the spool 200 to the pipe 402 as will be described in the operation of the pipe removal assembly 100 below.

Referring again to FIG. 4, a lug 408 is coupled along the flexible element 404, in one example. The lug 408 is sized and shaped to have a larger profile than the pipe 402. As shown in FIG. 4, the lug 408 has a conical geometry. In another example, the lug 408 has a frusto-conical geometry. In still another example, the lug 408 includes cutting surfaces that cut at least a portion of the pipe 402 before engaging against the pipe 402 and fully transmitting pulling force to remove the pipe from the ground, as described below. In another example, the lug 408 includes features for engaging against the pipe 402, such as, but not limited to hooks, fasteners and the like. The lug 408 engages against the pipe 402, for instance an end of the pipe 402 near the second trench 406. In still another example, the flexible element 404 engages with the pipe 402 through friction. For instance, the flexible element 404 couples with the inner surface of the pipe 402 as the flexible element 404 is navigated through the pipe 402. The flexible element 404 contacts the pipe 402 at multiple points on the pipe 402 inner surface thereby multiplying the frictional coupling force between the flexible element 404 and the pipe 402. Optionally, the flexible element 404 contacts the pipe 402 inner surface at bends and elbows in the pipe 402. Thus, in one example both friction and the lug 408 cooperate to provide the pulling forces necessary to remove the pipe 402 from the ground.

In operation, the ground working implement 102 positions the pipe removal assembly 100 in the first trench 400 substantially adjacent to the pipe 402. The flexible element 404 is navigated through the pipe 402 through pushing and/or pulling of the element. In one example, the flexible element 404 is navigated through the pipe 402 from the second trench 406 to the first trench 400 and coupled with the spool 200 (FIG. 2A) to permit wrapping of the flexible element 404 around the spool. The lug 408 is already coupled with the flexible element 404 in another example. In yet another example, the flexible element 404 is navigated through the pipe 402 from the first trench 400 to the second trench 406. The lug 408 is then coupled with the flexible element 404.

Referring now to FIGS. 2A and 4, the mechanical advantage system is operated, for instance the input sprockets 208 are rotated by the motor 104 (FIG. 1A). Through the drive chains, the input sprockets 208 rotate the output sprockets 206 thereby rotating the spool 200. The mechanical advantage generated between the input and output sprockets 206, 208 generates sufficient torque on the spool 200 to pull the flexible element 404 within the pipe 402. As the flexible element 404 is pulled the lug 408 is pulled into engagement with the pipe 402. The lug 408 transmits the pulling force to the pipe 402 and moves the pipe 402 through the ground with the flexible element 404. The pipe 402 and the flexible element 404 are both pulled as a composite assembly having the tensile strength of at least the flexible element 404. In one example, the pipe 402 is constructed with ductile material, such as lead, copper and the like. Optionally, the flexible element 404 has a tensile strength greater than that of the pipe 402 and provides structural support to the ductile pipe 402 by engaging the pipe near an end opposed to the pipe removal assembly 100. In other examples, the flexible element 404 engages the ductile pipe 402 at multiple locations along the inner surface of the pipe 402 (e.g., frictionally engages). Pulling the flexible element 404 and the pipe 402 together with the lug 408 puts the pipe 402 in compression and substantially prevents the pipe 402 from splitting radially (e.g., because of tensile failure). The flexible element 404 thereby ensures substantially the entire pipe is pulled out of the ground. The pipe 402 is retained around the flexible element 404 and is pulled out of the ground with the flexible element.

As the composite assembly of the flexible element 404 and the pipe 402 are removed both are wrapped around the spool 200 (FIG. 2A). Because the flexible element 404 is coupled with the spool 200 and the pipe 402 is wrapped around the spool 200 the spool pulls both the flexible element 404 and the pipe 402 of the composite assembly. The pulling force is thereby transmitted to the pipe 402 through the spool 200 and through the flexible element 404 coupled with the pipe 402. Tensile failure of the pipe is substantially prevented because while tension is applied to the pipe 402 through the spool 200, the flexible element 404 pulls the pipe 402 in compression. The flexible element 404 thereby reinforces the pipe 402 with compression as the pipe 402 is pulled by the spool 200.

In one example, the spool 200 includes a slope (i.e., is at least partially conical) to ensure the coil of the pipe 402 and the flexible element 404 is sequentially wrapped around the spool 200. The pipe 402 deforms as it is wrapped around the spool 200 into a compact coil with the flexible element 404 therein. The flexible element 404 has sufficient flexibility to bend with the pipe, in one example. In another example, the flexible element 404 is deformed with the pipe 402 into the coil. The coil of the composite assembly is thereby conveniently wrapped and stored on the spool 200 without having to pull lengths of pipe 402 out of the trench 400. The coil of the composite assembly including the pipe 402 and the flexible element 404 is then discarded, as described below.

Referring again to FIG. 4, in another example, the lug 408 is sized and shaped to couple with a replacement pipe 410. When the lug 408 is pulled by the pipe removal assembly 100 the replacement pipe 410 is pulled behind the lug 408. The lug 408 thereby engages with the pipe 402 to ensure removal of the pipe 402 while also pulling the replacement pipe 410 into position to take the place of the pipe 402. In one example, the pipe removal assembly 100 removes the pipe 402 and positions the replacement pipe 410 in a single operation. In another example, the pipe removal assembly 100 removes a pipe 402 including for instance lead or copper and replaces the pipe 402 with a replacement pipe 410.

Referring now to FIGS. 5A-C, the pipe removal assembly 100 is shown in three different states. In FIG. 5A, the pipe removal assembly 100 is shown in the process of wrapping the composite assembly including the pipe 402 and the flexible element around the spool 200. As described above, the spool 200 is rotated and the pipe 402 and the flexible element 404 (FIG. 4) are wrapped around the spool 200 into a compact coil. The coil of the pipe 402 and the flexible element are shown substantially wrapped around the spool 200 in FIG. 5B. As shown in FIG. 5C, in one example, the coil of the pipe 402 and the flexible element 404 are moved off of the spool 200 and discarded.

Referring again to FIG. 5C, the end plate 108 is removed from the spool 200 as described above. In one example, the end plate 108 is rotated with respect to the spool 200 and the pins 112 (FIG. 1B) are moved into the larger openings of the slots 110 (FIG. 1B) to facilitate removal of the end plate 108. In yet another example, the end plate 108 is removed with other features, for instance, bolts, clips, retaining pins and the like. Optionally, the push plate 212 (described above) then engages against the coiled pipe 402 and ejects it off of the spool 200. As shown in FIGS. 2A and 5C, the push plate 212 is moved over at least a portion of the spool 200 by the thrusting systems 214. In another example, the thrusting systems 214 include hydraulic pistons and cylinders, and are operated by the hydraulics of the ground working implement 102 to move the push plate 212. Because the pipe 402 and the flexible element 404 are wrapped into the compact coil, the push plate 212 quickly ejects the element 404 and the pipe 402 in a single step. In yet another example, a taper is included on the spool 200 to facilitate removal of the coiled composite assembly. The coiled composite assembly of the flexible element 404 and the pipe 402 is compact and easy to remove from the work area. Additionally, the flexible element 404, such as a metal strand, is inexpensive relative to steel cables and thereby easily replaced after discarding the coiled pipe 402. After ejecting the composite assembly of the flexible element 404 and the pipe 402, the end plate 108 is coupled with the spool 200 to make the pipe removal assembly 100 ready for another operation.

Figure 6:
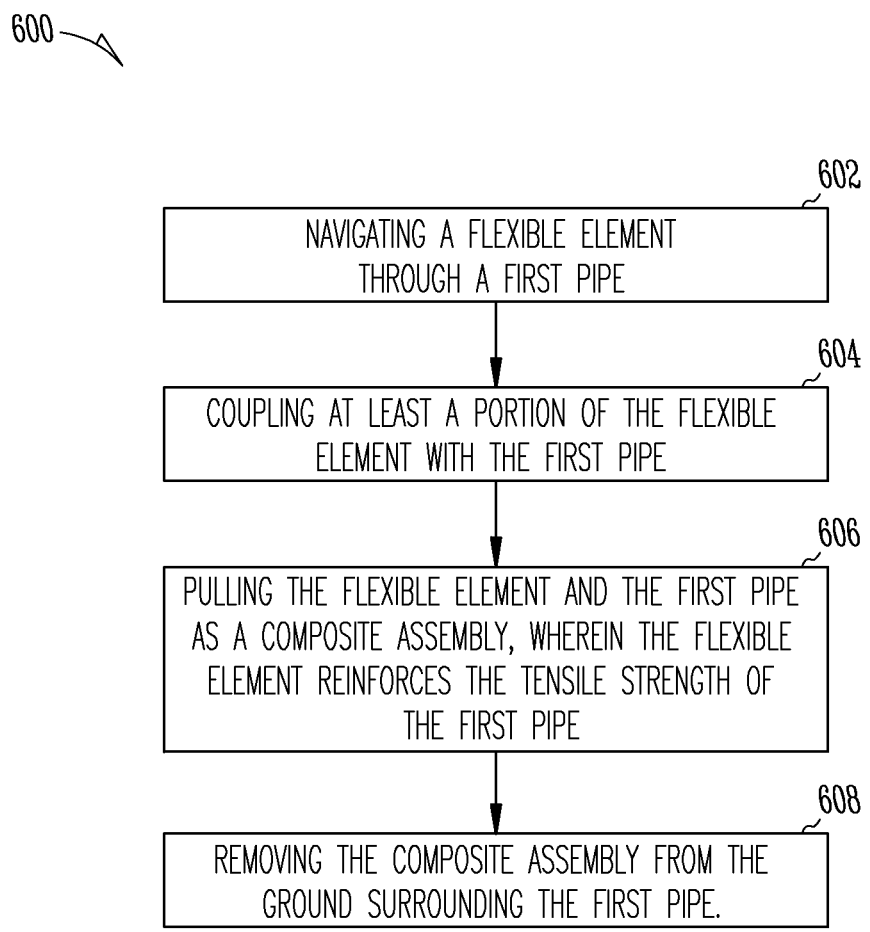
FIG. 6 is a block diagram showing one example of a method for removing an in-ground pipe.

FIG. 6 shows one example of a method 600 for removing an in-ground pipe, such as pipe 402 shown in FIG. 4. One example of a pipe removal assembly used in the method 600 is shown in FIGS. 1A-5C as pipe removal assembly 100, and is referenced below. At 602, a flexible element 404 is navigated through the first pipe 402. In one example, the flexible element 404 is a strand (e.g. a small number of wires wrapped around each that is stiffer than a cable). The flexible element 404 provides supplementary tensile strength to the pipe 402. Optionally, the flexible element has a greater tensile strength than the first pipe. At 604, at least a portion of the flexible element 404 is coupled with the first pipe 402. In another example, coupling at least the portion of the flexible element 404 with the first pipe 402 includes engaging a lug 408 on the flexible element with the first pipe. In other examples, the flexible element 404 is coupled with the first pipe 402 by frictional contact between the flexible element 404 and the interior of the pipe 402. At 606, the flexible element 404 and the first pipe 402 are pulled as a composite assembly. In yet another example, the first pipe 402 (e.g., lead pipe, copper pipe and the like) is pulled in compression between the point of coupling between the flexible element 404 and the first pipe 402 and a proximal end of the flexible element (e.g., near the spool 200). While the first pipe 402 is pulled in tension (e.g., by the spool 200) the flexible element 404 also compresses the first pipe 402. The flexible element 404 substantially prevents tensile failure of the first pipe 402 by reinforcing the first pipe 402. At 608, the composite assembly is removed from the ground surrounding the first pipe 402. In still another example, removing the composite assembly from the ground includes wrapping the composite assembly around the spool 200. Optionally, wrapping the composite assembly around the spool 200 includes deforming the first pipe 402 with the flexible element 404 therein into a coil. Although wrapping the composite assembly into a coil provides a convenient collection of the old pipe, in another option, the flexible element 404 and the pipe 402 are pulled by other means such as attaching the composite assembly to an implement and moving the implement in reverse (i.e., away from the flexible element and pipe).

Several options for the method 600 follow. In one example, navigating the flexible element 404 through the first pipe 402 includes pushing the flexible element 404 (e.g., a strand or strip) through the first pipe 402. In another example, coupling at least the portion of the flexible element 404 with the first pipe 402 includes engaging a pipe splitter on the flexible element with the first pipe. The method 600 includes, in yet another example, discarding the composite assembly.

Figure 7:
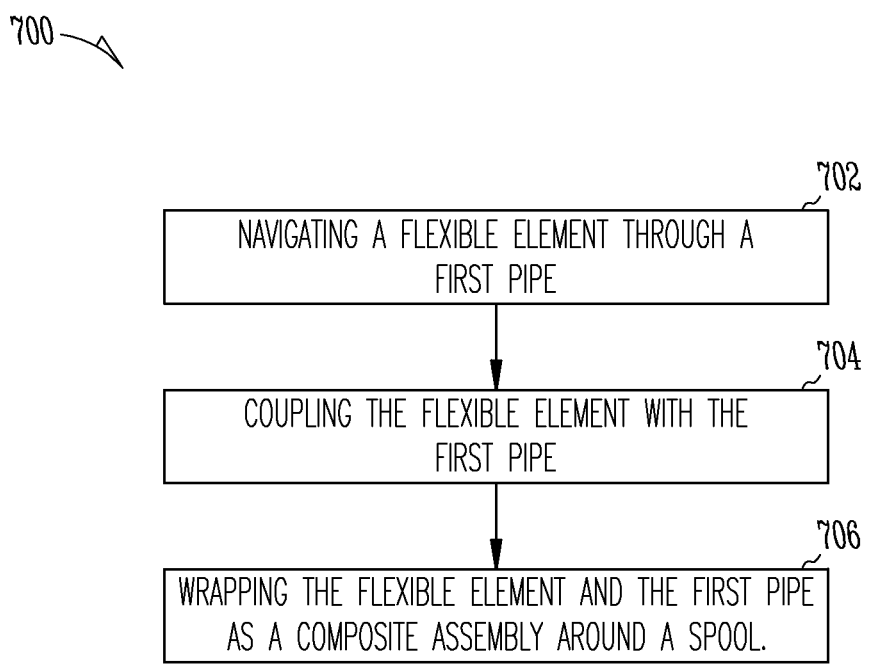
FIG. 7 is a block diagram showing another example of a method for removing an in-ground pipe.

FIG. 7 shows another example of a method 700 for removing an in-ground pipe. As described above, one example of a pipe removal assembly used in the method 700 is shown in FIGS. 1A-5C as pipe removal assembly 100, and is referenced below. At 702 a flexible element 404 is navigated through a first pipe 402. For example, the flexible element 404 is a strand including a small number of wires that provides stiffness to the strand and allows for pushing and pulling through the first pipe 402. The flexible element 404 provides supplementary tensile strength to the pipe 402 and substantially prevents tensile failure of the pipe 402. Optionally, the flexible element 404 has a tensile strength at least greater than the tensile strength of the first pipe 402. At 704, the flexible element 404 is coupled with the first pipe 402. In another example, coupling the flexible element 404 with the first pipe 402 includes engaging a lug 408 against the first pipe 402, and the lug 408 is coupled with the flexible element 404. In other examples, the flexible element 404 is coupled to the interior of the pipe 402 by frictional contact therebetween. At 706, the flexible element 404 and the first pipe 402 are wrapped around a spool 200 as a composite assembly. In yet another example, wrapping the flexible element 404 and the first pipe 402 as the composite assembly includes pulling the first pipe 402 in compression between the point of coupling between the flexible element 404 and the first pipe 402 (e.g., at the lug and/or at frictional contact between the flexible element 404 and the interior of the pipe 402) and a proximal end of the flexible element 404 (e.g. near the spool 200). The flexible element 404 reinforces the first pipe 402 by applying compression thereto while the first pipe 402 is pulled (e.g., by the spool 200). Pulling the first pipe 402 in compression includes substantially preventing tensile failure of the first pipe 402, in still another example. Optionally, the first pipe 402 pulled in compression includes a pipe including lead (e.g., a pipe having insufficient tensile strength to be pulled out of the ground by itself).

Several options for the method 700 follow. In one example, the method 700 includes rotating the spool 200, and the flexible element 404 is coupled with the spool 200. The spool 200 is rotated with a chain drive (e.g., including input and output sprockets 208, 206), in another example. In yet another example, the spool 200 is rotated with a planetary gear assembly. Where the first pipe 402 is pulled in compression (described above) the method 700 may include pulling a second pipe 410 behind the first pipe 402, in still another example. Optionally, wrapping the flexible element 404 and the first pipe 402 as the composite assembly includes deforming the composite assembly into a coil. In a further example, the method 700 includes removing the composite assembly from the spool 200 (e.g., by pushing the composite assembly over the spool 200 with a push plate 212.

Figure 8:
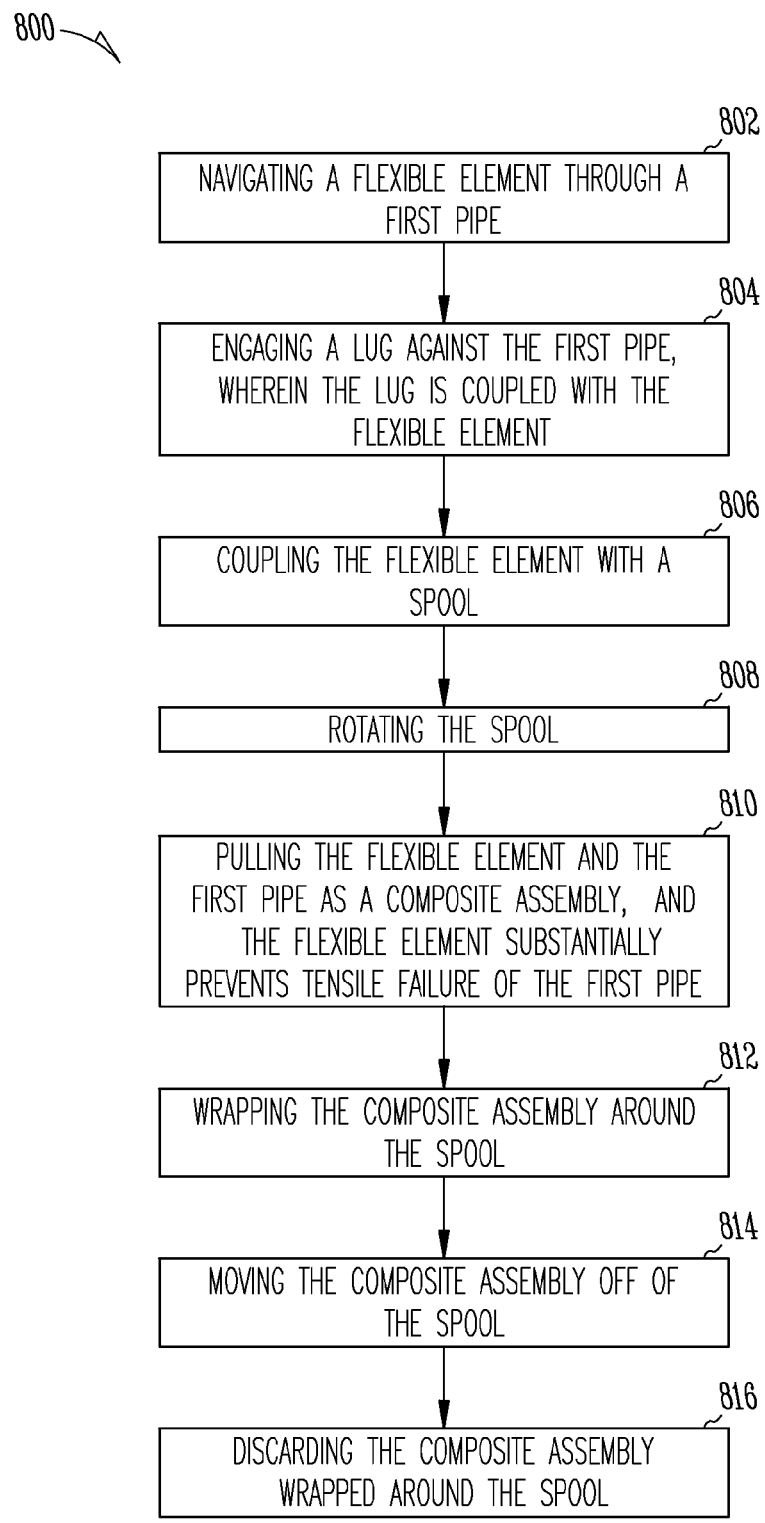
FIG. 8 is a block diagram showing yet another example of a method for removing an in-ground pipe.

FIG. 8 shows yet another example for a method 800 for removing an in-ground pipe. As described above, one example of a pipe removal assembly used in the method 800 is shown in FIGS. 1A-5C as pipe removal assembly 100, and is referenced below. At 802, a flexible element 404 is navigated through a first pipe 402. At 804, a lug 408 is engaged against the first pipe 402, and the lug 408 is coupled with the flexible element 404. At 806, the flexible element 404 is coupled with a spool 200 of the pipe removal assembly 100. At 808, the spool 200 is rotated. At 810, the flexible element 404 is pulled with the first pipe 402 as a composite assembly. In another example, the flexible element 404 reinforces the first pipe 402 by applying compression thereto while the first pipe 402 is pulled in tension (e.g., by the spool 200). Pulling the first pipe 402 in compression includes substantially preventing tensile failure of the first pipe 402, in still another example. At 812, the composite assembly is wrapped around the spool. At 814, the composite assembly is moved (e.g., pushed or pulled) off of the spool. At 816, the composite assembly is discarded.

Several options for the method 800 follow. In one example, navigating the flexible element 404 through the first pipe 402 includes pushing a strand through the first pipe 402. In another example, rotating the spool 200 includes rotating the spool 200 with a mechanical advantage system that has a greater output torque than an input torque. For instance, rotating the spool 200 includes rotating the spool 200 with a chain drive (e.g., with input and output sprockets 208, 206). In yet another example, pulling the flexible element 404 and the first pipe 402 as the composite assembly includes pulling the first pipe 402 in compression between the point of coupling between the flexible element 404 and the first pipe 402 and a proximal end of the flexible element 404 (e.g., near the spool 200).

CONCLUSION

The above described examples of pipe removal methods and assemblies provide devices and methods usable to remove in-ground pipes including pipes having a low tensile strength, such as lead and copper pipes. The pipe removal assembly pulls the pipe with the flexible element as a single composite assembly. The flexible element engages with the pipe at a location remote from the pipe removal assembly and pulls the pipe in compression between that location and the pipe removal assembly. At the same time, the pipe is pulled in tension (e.g., by the spool). The compression provided by the flexible element reinforces the pipe and substantially prevents tensile failure of the pipe. The pipe removal assembly including the flexible element thereby substantially prevents radial fracture of the pipe (i.e., fracture along the pipe circumference) and ensures the pipe is removed without leaving a fractured portion of the pipe behind.

Further, the pipe removal assembly wraps the composite assembly of the pipe with the flexible element therein around the spool. The composite assembly is deformed as it wraps around the spool and forms a compact coil that is easily discarded. The flexible element, for instance a metal strand that is inexpensive and easily replaceable remains within the coiled pipe and is discarded with the pipe. In one example, the pipe removal assembly includes a push plate that ejects the coiled pipe and flexible element off of the spool. The removed pipe is manageably stored on the spool and discarded as a compact coil thereby avoiding storage, transportation and disposal of cumbersome lengths of removed pipe.

Further still, the lug that couples the flexible element with the pipe includes, in one example, a feature sized and shaped to couple a replacement pipe thereon. The replacement pipe is pulled into position behind the lug while the original pipe with the flexible element is pulled and wrapped around the spool. The pipe removal assembly thereby efficiently removes and replaces pipes in a single step.

Although selected advantages are described above, the list is not intended to be exhaustive. Further, the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope of the invention should, therefore, be determined with reference to the appended claims, along with the full scope of equivalents to which such claims are entitled.

What is claimed is:

1. A method for pipe removal comprising:
navigating a flexible element through a pipe;
coupling at least a portion of the flexible element with the pipe;
pulling the flexible element and the pipe as a composite assembly, wherein the flexible element reinforces a tensile strength of the pipe; and
removing the composite assembly as a continuous unit from the ground surrounding the pipe.

2. The method for pipe removal of claim 1, wherein navigating the flexible element through the pipe includes navigating a strand through the pipe.

3. The method for pipe removal of claim 1, wherein navigating the flexible element through the pipe includes pushing the flexible element through the pipe.

4. The method for pipe removal of claim 1, wherein coupling at least the portion of the flexible element with the pipe includes engaging a lug on the flexible element with the pipe.

5. The method for pipe removal of claim 1, wherein coupling at least the portion of the flexible element with the pipe includes engaging a splitter on the flexible element with the pipe.

6. The method for pipe removal of claim 1, wherein pulling the flexible element and the pipe as a composite assembly includes at least pulling the pipe in compression between a coupling point of the flexible element and the pipe and a proximal end of the flexible element.

7. The method for pipe removal of claim 1, wherein removing the composite assembly from the ground includes wrapping the composite assembly around a spool.

8. The method for pipe removal of claim 7, wherein wrapping the composite assembly around the spool includes deforming the pipe with the flexible element therein into a coil.

9. The method for pipe removal of claim 1, wherein pulling the flexible element and the pipe as the composite assembly includes pulling a pipe including lead.

10. The method for pipe removal of claim 1, wherein navigating the flexible element through the pipe includes navigating a flexible element having a greater tensile strength than the pipe.

11. A method for pipe removal comprising:
navigating a flexible element through a pipe;
coupling the flexible element with the pipe; and
wrapping the flexible element and the pipe as a composite assembly around a spool to pull the pipe from the ground.

12. The method for pipe removal of claim 11, wherein coupling the flexible element with the pipe includes engaging a lug against the pipe, and the lug is coupled with the flexible element.

13. The method for pipe removal of claim 11, further comprising rotating the spool, and the flexible element is coupled with the spool.

14. The method for pipe removal of claim 13, wherein rotating the spool includes rotating the spool with a mechanical advantage system that has a greater output torque than an input torque.

15. The method for pipe removal of claim 14, wherein rotating the spool includes rotating the spool with a chain drive.

16. The method for pipe removal of claim 14, wherein rotating the spool includes rotating the spool with a planetary gear assembly.

17. The method for pipe removal of claim 11, wherein wrapping the flexible element and the pipe as the composite assembly includes pulling the pipe in both compression and tension between the point of coupling between the flexible element and the pipe and a proximal end of the flexible element.

18. The method for pipe removal of claim 17, wherein pulling the pipe includes pulling a pipe including copper.

19. The method for pipe removal of claim 17, wherein pulling the pipe includes pulling a replacement pipe into the ground behind the pipe being removed from the ground.

20. The method for pipe removal of claim 11, wherein wrapping the flexible element and the pipe as the composite assembly includes deforming the composite assembly into a coil.

21. The method for pipe removal of claim 20, further comprising removing the composite assembly from the spool.

22. The method for pipe removal of claim 21, wherein removing the composite assembly from the spool includes pushing the composite assembly over the spool with a push plate.

23. A method for pipe removal comprising:
navigating a flexible element through a pipe;
engaging a lug against the pipe, wherein the lug is coupled with the flexible element;
coupling the flexible element with a spool;
rotating the spool;
pulling the flexible element and the pipe as a substantially continuous composite assembly, and the flexible element substantially prevents tensile failure of the pipe;
wrapping the composite assembly around the spool;
moving the composite assembly off of the spool; and
discarding the composite assembly wrapped around the spool.

24. The method for pipe removal of claim 23, navigating the flexible element through the pipe includes pushing a strand through the pipe.

25. The method for pipe removal of claim 23, wherein rotating the spool includes rotating the spool with a mechanical advantage system that has a greater output torque than an input torque.

26. The method for pipe removal of claim 25, wherein rotating the spool includes rotating the spool with a chain drive.

27. The method for pipe removal of claim 23, wherein pulling the flexible element and the pipe as the composite assembly includes at least pulling the pipe in compression between the point of coupling between the flexible element and the pipe and a proximal end of the flexible element.

* * * * *